(12) United States Patent
Rylskyi Rylovnikov

(10) Patent No.: US 10,432,984 B2
(45) Date of Patent: Oct. 1, 2019

(54) CONTEXT-SENSITIVE NOTIFICATION DISPLAY

(71) Applicant: DISH UKRAINE L.L.C., Kharkov (UA)

(72) Inventor: Igor Rylskyi Rylovnikov, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 0 days.

(21) Appl. No.: 15/536,055

(22) PCT Filed: Dec. 19, 2014

(86) PCT No.: PCT/UA2014/000131
§ 371 (c)(1),
(2) Date: Jun. 14, 2017

(87) PCT Pub. No.: WO2016/099433
PCT Pub. Date: Jun. 23, 2016

(65) Prior Publication Data
US 2017/0374397 A1 Dec. 28, 2017

(51) Int. Cl.
*H04N 21/234* (2011.01)
*H04N 21/458* (2011.01)
(Continued)

(52) U.S. Cl.
CPC ..... *H04N 21/23418* (2013.01); *H04N 21/235* (2013.01); *H04N 21/43* (2013.01); *H04N 21/458* (2013.01); *H04N 21/4622* (2013.01); *H04N 21/4882* (2013.01); *H04N 21/84* (2013.01)

(58) Field of Classification Search
CPC ........... H04N 21/23418; H04N 21/235; H04N 21/43; H04N 21/458
See application file for complete search history.

(56) References Cited

U.S. PATENT DOCUMENTS

2007/0047520 A1* 3/2007 Byers ................ H04M 3/42357
370/352
2007/0098351 A1* 5/2007 East ....................... H04H 20/33
386/262
(Continued)

FOREIGN PATENT DOCUMENTS

WO 02/43353 A2 5/2002
WO 2016/099433 A1 6/2016

OTHER PUBLICATIONS

International Search Report and Written Opinion for PCT/UA2014/000131 dated May 29, 2015, all pages.
(Continued)

*Primary Examiner* — Sumaiya A Chowdhury
(74) *Attorney, Agent, or Firm* — Kilpatrick Townsend & Stockton LLP

(57) ABSTRACT

Controlling the display of notifications to a television viewer based on a contextual parameter that is associated with programming instantly being viewed. An example of such a parameter may include the degree of tension or conflict in a particular movie that is being watched by the television viewer. In this example, a television reciever may monitor during output of the particular movie underlying metadata that quantifies the degree of tension or conflict in the particular movie at particular instants in time.

19 Claims, 10 Drawing Sheets

(51) Int. Cl.
  *H04N 21/462* (2011.01)
  *H04N 21/488* (2011.01)
  *H04N 21/84* (2011.01)
  *H04N 21/235* (2011.01)
  *H04N 21/43* (2011.01)

(56) References Cited

U.S. PATENT DOCUMENTS

| 2009/0249387 | A1* | 10/2009 | Magdy | G06F 17/30787 |
| | | | | 725/32 |
| 2010/0058395 | A1 | 3/2010 | Goergen et al. | |
| 2013/0061259 | A1 | 3/2013 | Raman et al. | |
| 2013/0088352 | A1* | 4/2013 | Amis | G08B 15/002 |
| | | | | 340/540 |

OTHER PUBLICATIONS

U.S. Appl. No. 15/535,648, filed Jun. 13, 2017 Non-Final Rejection dated Mar. 20, 2019, all pages.

* cited by examiner

CONTEXT-SENSITIVE NOTIFICATION DISPLAY

CROSS-REFERENCE TO RELATED APPLICATIONS

This application is a U.S. National Stage of PCT International Application No. PCT/UA2014/000131, filed on Dec. 19, 2014, entitled "CONTEXT-SENSITIVE NOTIFICATION DISPLAY," which is hereby incorporated by reference in its entirety.

BACKGROUND

The advent of the digital video recorder, multi-tuner television receiver, and the availability of high-capacity and affordable computer-readable storage devices have made available many possibilities to television programming service providers and viewers alike. In addition, viewers have come to expect flexibility and convenience with respect to the accessing of content via their television receivers.

SUMMARY

In an aspect, a method may include or comprise: outputting, by a television receiver, particular programming content for display by a presentation device; monitoring, by the television receiver, a stream of metadata that is temporally synchronized to the particular programming content; and blocking, by the television receiver, output of a notification for display by the presentation device during the outputting of the particular programming content at a time and when a particular instance of metadata of the stream of metadata has a discrete value that is greater than or equal to a pre-defined and user-configurable threshold value.

In an aspect, a television receiver may include or comprise: a processor; and a memory element communicatively coupled with and readable by the processor, and having stored therein processor-readable instructions that when executed cause the processor to: monitor a stream of metadata that is synchronized to particular programming content as the particular programming content is output for display by a presentation device communicatively coupled to the television receiver; and prevent output of a notification for display by the presentation device during the output of the particular programming content at a time and when a particular instance of metadata of the stream of metadata has a value that is greater than or equal to a particular threshold value.

In an aspect, a computer-implemented method may include or comprise: monitoring, by a computing device, a track of metadata that is synchronized to particular media content, during the output of the particular media content for display by a presentation device; determining, by the computing device at a particular time, that a particular instance of metadata of the stream of metadata has a value that is greater than or equal to a threshold value; and blocking, by the computing device in response to the determining, output of any notifications for display by the presentation device during the outputting of the particular programming content starting at the particular time and for a pre-defined time period.

Other aspects are possible.

DETAILED DESCRIPTION

Figure 1:
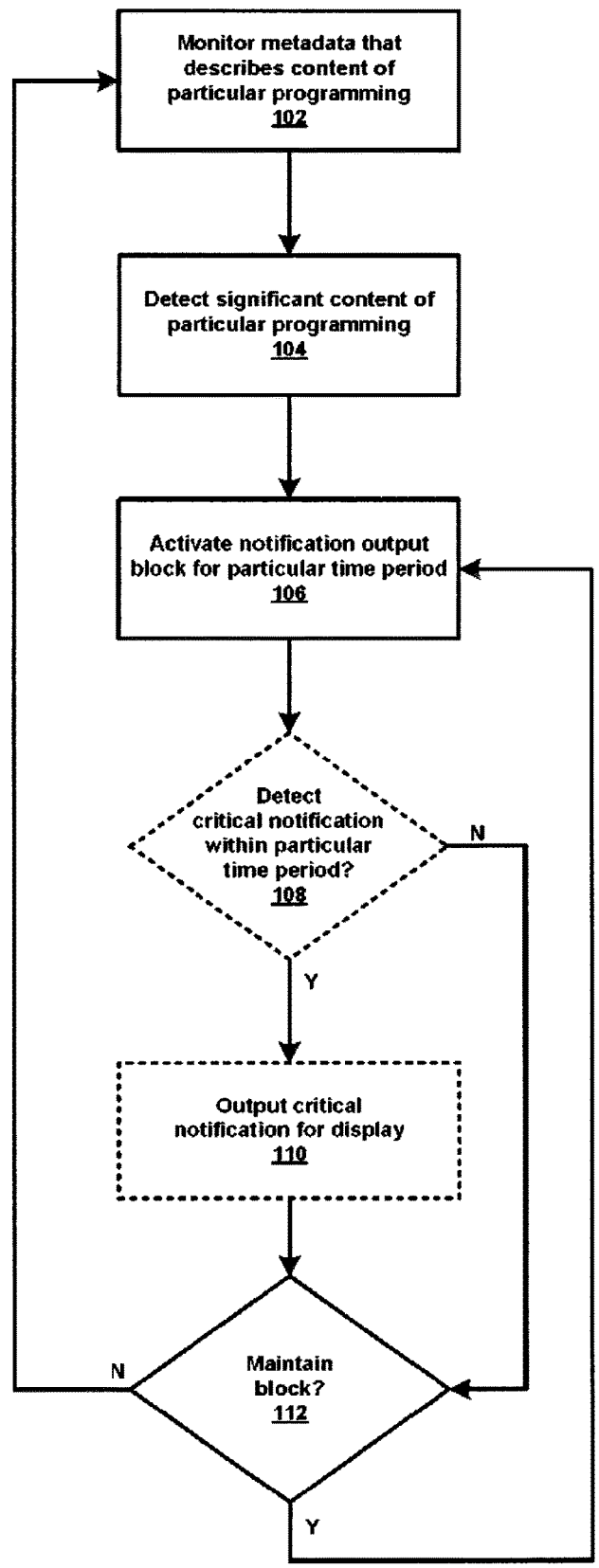
FIG. 1 shows a first example method according to this disclosure.

The present disclosure is generally directed to or towards systems and methods for controlling the display of notifications to a television viewer based on a "contextual" parameter that is associated with programming currently or instantly being viewed. An example of such a parameter may include the degree of tension or conflict in a particular movie that is being watched by the television viewer. In this example, it is contemplated that a television receiver may monitor during output of the particular movie underlying metadata that quantifies the degree of tension or conflict in the particular movie at particular, possibly periodic, instants in time. Here, when the metadata that quantifies the degree of tension or conflict in the particular movie at a particular instant in time is equal to or exceeds a predetermined and configurable threshold value, the television receiver may block or prevent the output of any type of notification for at least a finite time period. Advantageously, a particular notification would then not interrupt or otherwise disrupt the viewing experience of the particular movie. In the context of satellite television programming, this may serve to entice new customers to subscribe to services as offered by a particular satellite television provider, as well as provide an incentive for existing customers to maintain their loyalty and/or relationship with the satellite television provider. Although not so limited, an appreciation of the various aspects of the present disclosure may be gained from the following discussion in connection with the drawings. For instance, referring to FIG. 1, a first example method 100 is shown according to this disclosure.

At step 102, a particular television receiver may monitor, during output of particular programming to a presentation device for display, such as a television or smartphone for example, a stream of metadata that describes or embodies features or aspects of the programming itself. For example, the stream of metadata may at particular intervals in time include or comprise of a parameter that quantifies the degree of tension or conflict in the programming. For example, the stream of metadata may comprise the data pairs: 1-3; 2-3; 3-3; 4-6; 5-9, and etc. In this example, at minute "1" into the programming, the parameter that quantifies the degree of tension or conflict is "3," at minute "4" the parameter that quantifies the degree of tension or conflict is "6," at minute "5" the parameter that quantifies the degree of tension or conflict is "9," and etc. Here, it is contemplated that the parameter may be defined on, or in reference to, a scale of "1-10" for example, where a value of "1" may correspond or otherwise be assigned to a "very low" degree of tension or conflict, a value of "5" may correspond to a "moderate" degree of tension or conflict, and a value of "10" may correspond to a "very high" degree of tension or conflict. Many other embodiments are possible, and it will be appreciated that the scale and/or quantifier of degree of tension or conflict may be defined as desired, and further may or may not be implementation-specific.

Next, at step 104, the television receiver may identify or otherwise detect particular "significant" content within the programming based upon the parameter that quantifies the degree of tension or conflict in the programming. Here, it is contemplated that the television receiver may be programmed to compare the parameter that quantifies the degree of tension or conflict in the programming with a predetermined and configurable threshold value, and then based upon that comparison make a determination as to whether or not an associated point in time of the programming contains (or not) what might be considered to be potentially significant or important content within the programming. For example, assume the stream of metadata comprises the data pairs: 1-3; 2-3; 3-3; 4-6; 5-9, and etc., and that the predetermined and configurable threshold value has a value of "5." In this example, the television receiver may identify or otherwise determine that content in the programming at minute "1" is "insignificant," since the parameter that quantifies the degree of tension or conflict is "3" at that time within the programming, that the content in the programming at minute "4" is "significant," since the parameter that quantifies the degree of tension or conflict is "6" at that time, and etc. In this manner, the television receiver may identify or otherwise detect particular significant content within the programming based upon the parameter that quantifies the degree of tension or conflict in the programming, the same of which is embedded within a "hidden" track or stream of metadata that describes or embodies features or aspects of the programming. The track or stream is "hidden" because itself is not observable or directly accessible to the viewer, and an example of which is discussed in further detail below in connection with at least FIG. 6.

Next, at step 106, the television receiver may activate or otherwise engage a block of output of any type of notification for a finite time period based upon the detection particular significant content within the programming at step 104. Here, the term "block" may refer to preventing or stopping output of any type of notification to a presentation device for display by the same, and further it is contemplated that the finite time period is a predetermined and configurable value. An example of such a finite time period may include "5" minutes, for instance. In this example, assume the track or stream of metadata comprises the data pairs: 1-3; 2-3; 3-3; 4-6; 5-9, and etc., and that the predetermined and configurable threshold value has a value of "5." Here, the television receiver may determine that the programming has significant content starting at minute "4" and thus may block the output of any particular notification for display at least until minute "9" of or in the programming. Advantageously, a particular notification would not then be output by the television receiver for display by a presentation device during at least the minutes "4-9" within or of the programming, so as to not interrupt or otherwise disrupt the viewing experience of the programming. However, it is contemplated that the television receiver may optionally (indicated by intermittent line in FIG. 1) be programmed to output a particular notification for display that which might be considered critical or emergency-related, for example.

For example, at step 108, the television receiver may make a determination during the particular time period as to whether or not a particular notification that might be considered critical or related to an emergency, etc., is scheduled or otherwise generated so as to be output by the television receiver for display by a presentation device, during the particular time period. Here, it is contemplated that the television receiver may be programmed so as to make a determination as to whether or not any particular notification might be considered or classified as critical or related to an emergency, and further such a classification may be implementation-specific. For example, assume the television receiver is configured and/or arranged to serve as a central controller and access point in a home network and home automation environment within a particular residence, and is itself programmed to output a particular notification for display by a presentation device when a home security system is engaged or activated to inform a viewer of the status of the home security system. Here, a particular notification might be considered "non-critical" if the same is simply designed to inform a viewer that the status of the home security system is as it should be, or "OK." However, a particular notification may be considered "critical" if the particular notification is designed to inform the viewer that the status of a particular window in the residence has been "opened" or "broken" or the like. Other embodiments are possible.

If, for example, the television receiver determines at step 108 that a critical notification is scheduled or otherwise generated so as to be output by the television receiver for display by a presentation device during the particular time period, process flow within the method 100 may branch to step 110. At step 110, the critical notification may be output by the television receiver for display by a presentation device during the particular time period. Advantageously, a viewer may then be notified of a critical or possible emergency-related event. If, however, the television receiver determines at step 108 that a critical notification is not scheduled or otherwise generated so as to be output by the television receiver for display by a presentation device during the particular time period, process flow within the method 100 may branch to step 112.

At step 112, the television receiver may determine whether or not to maintain the block for an additional incremental time period that may or may not have a length the same as the time period mentioned above in connection with step 106. For example, assume the track or stream of metadata comprises the data pairs: 8-5; 9-5; 10-4; 11-4; 12-3, and etc., and that the television receiver has not output for display any particular notification during the minutes "4-9" of or within the programming, to continue with the above-example. Here, the television receiver may be programmed to "look-ahead" and/or "look-behind" in the stream of metadata to determine whether or not the content in the programming near or adjacent to minute "9" is significant or not. It is contemplated that the extent by which the television receiver may be programmed to look-ahead and/or look-behind in the stream of metadata is configurable.

For example, the television receiver may identify or otherwise determine that the content in the programming at minute "8" is "insignificant," since the parameter that quantifies the degree of tension or conflict is "5" at that time, and that the content in the programming at minute "10" is "insignificant," since the parameter that quantifies the degree of tension or conflict is "4" at that time. Here, the television receiver may determine to not maintain the block for an additional incremental time period because the television receiver has not discovered any potentially significant content around the endpoint of "9" minutes into the programming. Process flow within the method 100 may then branch back to step 102. Such a branch is intended to show that flow within the method 100 is continuous.

However, if the track or stream of metadata comprises the data pairs: 8-9; 9-9; 10-10; 11-9; 12-8, for example, and that the television receiver has not output for display any particular notification during the minutes "4-9" of the programming, the television receiver may identify or otherwise determine that the content in the programming at minute "8" is "significant," since the parameter that quantifies the degree of tension or conflict is "9" at that time, and that the content in the programming at minute "10" is "significant," since the parameter that quantifies the degree of tension or conflict is "10" at that time. Here, the television receiver may maintain the block for an additional incremental time period, such as an additional 5 minutes for example, because potentially significant content around the endpoint of "9" minutes into the programming has been discovered. Process flow within the method 100 may then branch back to step 106. Such a branch is intended to show that flow within the example method 100 is continuous, so as to continuously block output of notifications (or any other type of conceivable interruption) based on the stream of metadata that describes features or aspects of the particular programming. Further scenarios and/or beneficial aspects associated with controlling the display of notifications to a television viewer based on a contextual parameter that is associated with programming instantly being viewed are described in detail below in connection with FIGS. 2-8.

Figure 2:
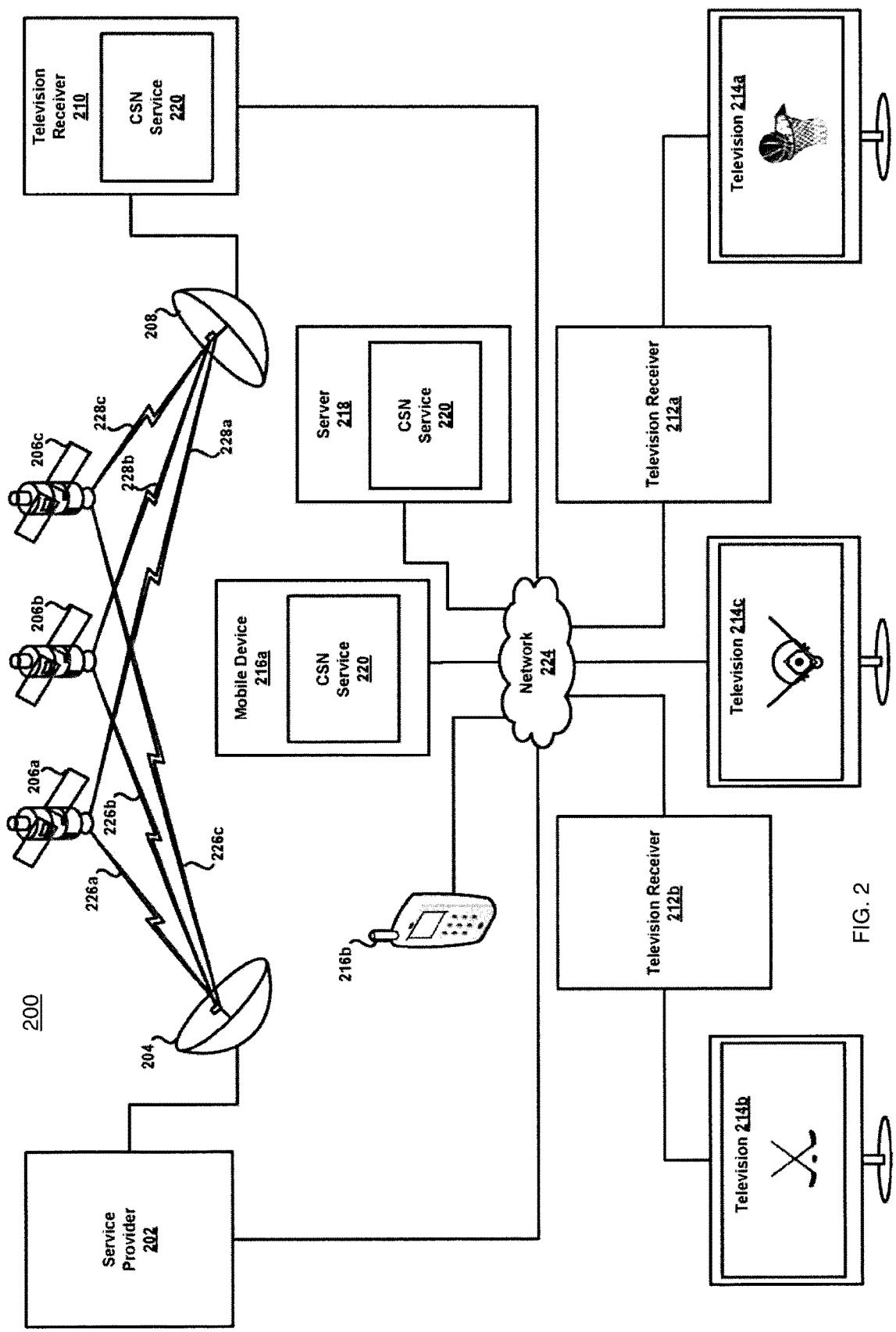
FIG. 2 shows an example content distribution system according to this disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include a service provider 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218 that may be associated with the service provider 202. Additionally, the PTR 210, computing devices 216a-b, and server 218 may include or otherwise exhibit a CSN (Context-Sensitive Notifications) service 220. In general, the CSN service 220 may be configured and/or arranged for controlling the display of notifications to a television viewer based on a contextual parameter that is associated with programming instantly being viewed, as discussed in further detail below.

The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMUHDCP (High-Definition Multimedia Interface/High-bandwidth Digital Content Protection), etc. Other embodiments are possible. For example, one or more of the various elements or components of the example system 200 may be configured to communicate in accordance with the MoCA® (Multimedia over Coax Alliance) home entertainment networking standard. Still other embodiments are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal, plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other embodiments are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
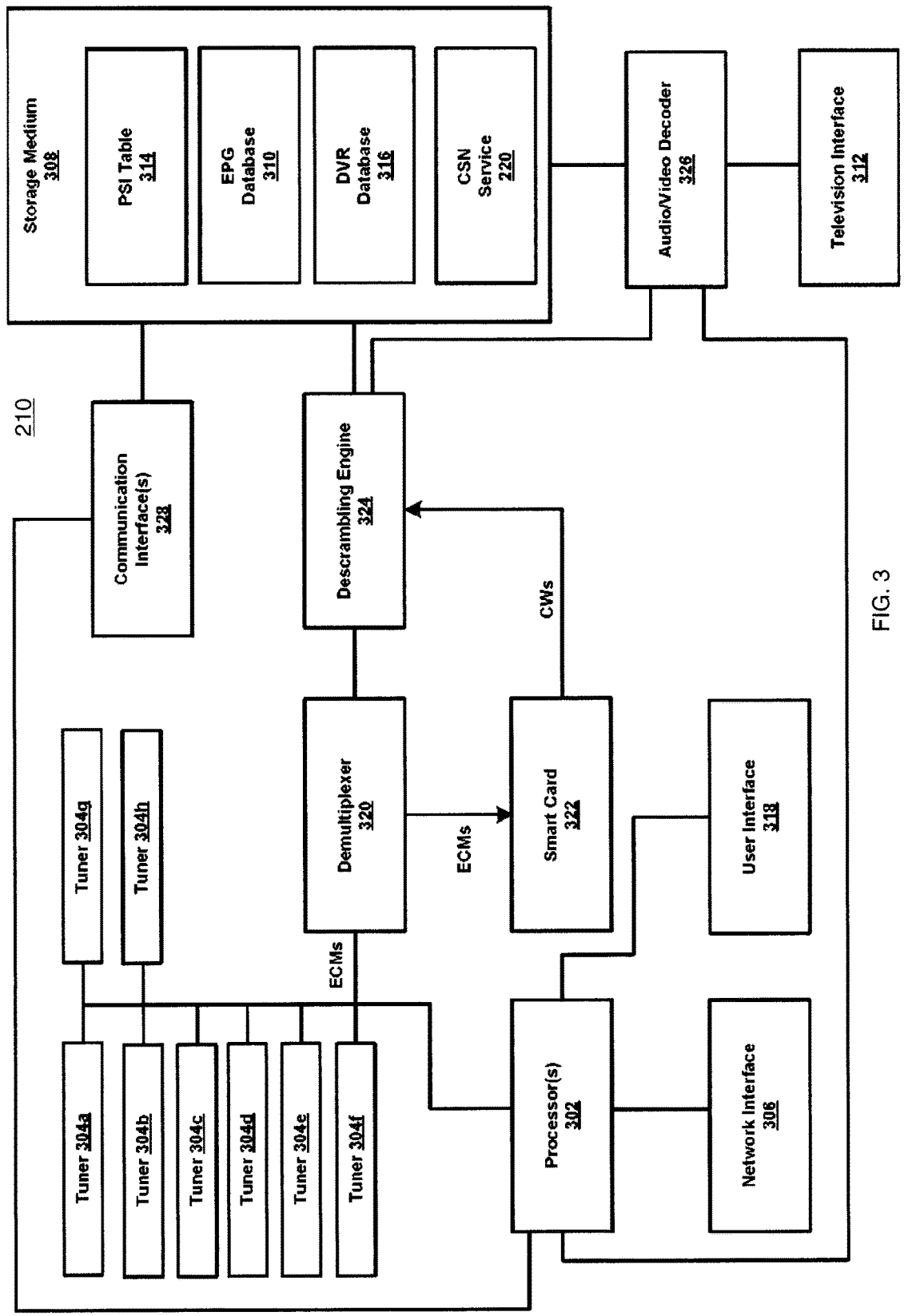
FIG. 3 shows an example block diagram of a television receiver of FIG. 2.

Referring now to FIG. 3, an example block diagram of the PTR 210 of FIG. 2 is shown in accordance with the disclosure. In some embodiments, the STRs 212a-b may be configured in a manner similar to that of the PTR 210. In some embodiments, the STRs 312a 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-b, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other embodiments, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-b may be used to tune to television channels, such as television channels transmitted via satellites 306a-c. Each one of the tuners 304a-b may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 206a-c, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the CSN service 220 mentioned above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-b and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other embodiments, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4       | 1         | 2           | 27      | 2001       | 1011      |
| 5       | 2         | 11          | 29      | 2002       | 1012      |
| 7       | 2         | 3           | 31      | 2003       | 1013      |
| 13      | 2         | 4           | 33      | 2003, 2004 | 1013      |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some embodiments, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-b, television channels received via satellite may contain at least some encrypted or scrambled data. Packets of audio and video may be scrambled to prevent unauthorized users, such as nonsubscribers, from receiving television programming without paying the service provider 202. When one of the tuners 304a-b is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 260 may decrypt the ECM to obtain some number of control words. In some embodiments, from each ECM received by the smart card 322, two control words are obtained. In some embodiments, when the smart card 322 receives an ECM, it compares the ECM to the previously received ECM. If the two ECMs match, the second ECM is not decrypted because the same control words would be obtained. In other embodiments, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-b may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing devices 216a-b as shown in FIG. 2. It is contemplated that the communication interface 328 may take or exhibit any form as desired, and may be configured in a manner so as to be compatible with a like component or element incorporated within or to the computing devices 216a-b, and further may be defined such that the communication link may be wired and/or or wireless. Example technologies consistent with the principles or aspects of the present disclosure may include, but are not limited to, Bluetooth®, WiFi, NFC (Near Field Communication), and/or any other communication device or subsystem similar to that discussed below in connection with FIG. 8.

For brevity, the PTR 210 is depicted in a simplified form, and may generally include more or fewer elements or components as desired, including those configured and/or arranged for implementing various features for controlling the display of notifications to a television viewer based on a contextual parameter that is associated with programming instantly being viewed. For example, the PTR 210 is shown in FIG. 3 to include the CSN service 220 as mentioned above in connection with FIG. 2. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
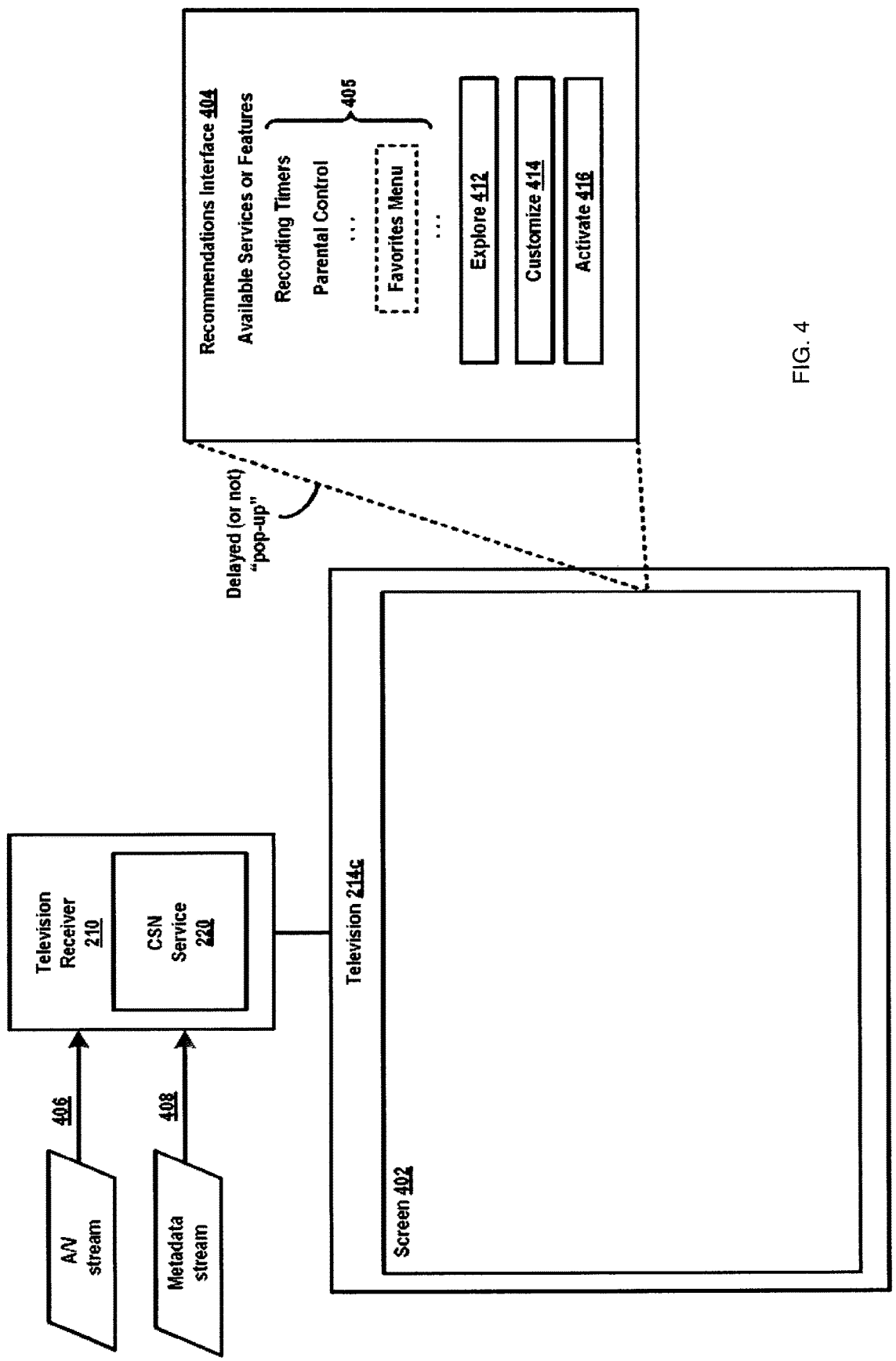
FIG. 4 shows first example aspects of the system of FIG. 2 in detail.

Referring now to FIG. 4, first example aspects of the system 200 of FIG. 2 are shown in detail. In particular, the PTR 210 and the television 214*c* are shown, in which the movie Big Trouble in Little China is currently being output by the PTR 210 to the television 214*c* for display via a screen 402 of the television 214*c*. Also shown is a particular pop-up interface 404 that includes a number of user-selectable links or controls 405 and that may in certain circumstances be displayed on the screen 402 of the television 214*c*. Here, the pop-up interface 404 when displayed may wholly or at least partially be superimposed over the movie Big Trouble in Little China as currently being output by the PTR 210 to the television 214*c*, so as to at least partially overlay or obscure or cover-up the movie Big Trouble in Little China from view. In other words, if output by the PTR 210 to the television 214*c* for display, the pop-up interface 404 might interrupt or otherwise disrupt the viewing experience of the movie Big Trouble in Little China. As discussed throughout, the CSN service 220 of the PTR 210, for example, may block output or display of the pop-up interface 404 for at least a predetermined time period, unless the CSN service 220 makes a determination that the pop-up interface 404 could be considered critical or emergency-related.

For example, in practice, the PTR 210 may receive a packetized A/V stream 406 that comprises audio/video of the movie Big Trouble in Little China. Here, the PTR 210 may decode the A/V stream 406 and then transfer decoded audio/video of the movie Big Trouble in Little China to the television 214*c* for output thereby. In addition, the PTR 210 may receive a packetized metadata stream 408, concurrently or simultaneously with the A/V stream 406, that comprises at periodic intervals in time, for example, a parameter that quantifies the degree of tension or conflict in the movie Big Trouble in Little China. For example, the metadata stream 408 may comprise the data pairs: 1-3; 2-3; 3-3; 4-6; 5-9, and etc. In this example, at minute "1" into the movie Big Trouble in Little China, the parameter that quantifies the degree of tension or conflict is "3," at minute "4" the parameter that quantifies the degree of tension or conflict is "6," at minute "5" the parameter that quantifies the degree of tension or conflict is "9," and etc. Similar to that discussed above, it is contemplated that the parameter that quantifies the degree of tension or conflict may be defined with reference to a scale of "1-10," for example, where a value of "1" may correspond to a "very low" or "no" degree of tension or conflict, a value of "5" may correspond to a "moderate" or perhaps "rising" degree of tension or conflict, and a value of "10" may correspond to a "very high" or "peak" degree of tension or conflict. Many other embodiments are possible.

Based upon the data pairs embedded within the metadata stream 408, the CSN service 220 of the PTR 210 may identify or otherwise detect particular significant content within the movie Big Trouble in Little China. Here, it is contemplated that the CSN service 220 of the PTR 210 may be programmed to compare the parameter that quantifies the degree of tension or conflict in the movie Big Trouble in Little China at each instant in time with a predetermined and configurable threshold value, and then based upon that comparison make a determination as to whether or not an associated point in time contains or otherwise exhibits (or not) what might be considered to be significant content. For example, assume the metadata stream 408 comprises the data pairs: 1-3; 2-3; 3-3; 4-6; 5-9, and etc., and that the predetermined and configurable threshold value has a value of "5." In this example, the CSN service 220 of the PTR 210 may identify or otherwise determine that the content at minute "1" within the movie Big Trouble in Little China is "insignificant," since the parameter that quantifies the degree of tension or conflict is "3" at that time, that the content in the programming at minute "4" is "significant," since the parameter that quantifies the degree of tension or conflict is "6" at that time, and etc. In this manner, the CSN service 220 of the PTR 210 may identify or otherwise detect particular significant content within the movie Big Trouble in Little China based upon data pairs embedded within the metadata stream 408. Here, it is contemplated that the parameter that quantifies the degree of tension or conflict may be inserted into the metadata stream 408 at particular points in time via manual (e.g., human) insertion, or automatically (e.g., by computer without direct or explicit user-input) based upon an analysis of one or both of audio and video within or of the movie Big Trouble in Little China at any particular point in time. An example embodiment of the metadata stream 408 is shown and described in further detail below in connection with at least FIG. 6.

As alluded to above, it is contemplated that the CSN service 220 of the PTR 210 may activate or otherwise engage a block of the pop-up interface 404 for a finite time period based upon data pairs embedded within the metadata stream 408. An example of such a finite time period may include "5" minutes, for instance. In this example, assume the metadata stream 408 comprises the data pairs: 1-3; 2-3; 3-3; 4-6; 5-9, and etc., and that the CSN service 220 of the PTR 210 is programmed so as to use or utilize a predetermined and configurable threshold value has a value of "5." Here, the CSN service 220 of the PTR 210 may determine that the movie Big Trouble in Little China has "significant" content starting at minute "4" and thus may block the output of the particular pop-up interface 404 at least until minute "9," assuming that the pop-up interface 404 is scheduled to be or is generated by the PTR 210 so as to be output for display by the television 214*c* during that time. However, it is contemplated that the CSN service 220 of the PTR 210 may optionally be programmed to output the pop-up interface 404 when it is determined or found by CSN service 220 of the PTR 210 that the pop-up interface 404 is possibly critical or emergency-related, for example. An example of which is discussed in detail above in connection with at least FIG. 1.

If, for example, the CSN service 220 of the PTR 210 determines that the pop-up interface 404 is critical or emergency-related, the CSN service 220 of the PTR 210 may output the same for display by the television 214*c* during a particular blocked time period, such as between the minutes "4-9" of the movie Big Trouble in Little China. Otherwise, if the CSN service 220 of the PTR 210 determines that the pop-up interface 404 is not critical or not emergency-related, the CSN service 220 of the PTR 210 may prevent or block output of the same for display by the television 214*c* during a particular blocked time period.

Additionally, because a particular blocked time period is finite, e.g., 5 minutes, the CSN service 220 of the PTR 210 may determine whether or not to maintain the block for an additional incremental time period, that may or may not have a length the same as an original blocked time period. For example, assume the metadata stream 408 comprises the data pairs: 8-5; 9-5; 10-4; 11-4; 12-3, and etc., and that the CSN service 220 of the PTR 210 has not output for display any particular notification during at least minutes "4-9" of the movie Big Trouble in Little China.

Here, the CSN service 220 of the PTR 210 may be programmed to look-ahead and/or look-behind in the metadata stream 408, to determine whether or not the content in the movie Big Trouble in Little China near or adjacent or around minute "9" is significant or not. It is contemplated that the extent by the which the CSN service 220 of the PTR 210 may be programmed to look-ahead and/or look-behind in the metadata stream 408 is configurable. For example, the CSN service 220 of the PTR 210 may identify or otherwise determine that the content in the movie Big Trouble in Little China at minute "8" is "insignificant," since the parameter that quantifies the degree of tension or conflict is "5" at that time, and that the content at minute "10" is "insignificant," since the parameter that quantifies the degree of tension or conflict is "4" at that time. Here, the CSN service 220 of the PTR 210 may determine to not maintain the block for an additional incremental time period because the CSN service 220 of the PTR 210 has not discovered any potentially significant content around the endpoint of "9" minutes into the movie Big Trouble in Little China. Other embodiments are however possible. For example, the CSN service 220 of the PTR 210 could in some instances be programmed to look-ahead in time as far as needed or desired. As another example, the CSN service 220 of the PTR 210 could in some instances be programmed to look-behind in time as far as needed or desired. In other words, the extent to which the CSN service 220 of the PTR 210 is programmed to look-ahead and/or look-behind is configurable.

However, returning to the present example, if the metadata stream 408 comprises the data pairs: 8-9; 9-9; 10-10; 11-9; 12-8, and etc., for example, and the CSN service 220 of the PTR 210 has not output for display any particular notification during at least minutes "4-9" of the movie Big Trouble in Little China, the CSN service 220 of the PTR 210 may identify or otherwise determine that the content in the movie Big Trouble in Little China at minute "8" is "significant," since the parameter that quantifies the degree of tension or conflict is "9" at that time, that the content at minute "10" is "significant," since the parameter that quantifies the degree of tension or conflict is "10" at that time, and etc. Here, the CSN service 220 of the PTR 210 may determine to maintain the block for an additional incremental time period, such as an additional 5 minutes or an additional 10 minutes for example, because potentially significant content around the endpoint of "9" minutes into the movie Big Trouble in Little China programming has been discovered. An example of such an implementation is similar to that discussed above in connection with FIG. 1.

In FIG. 4, the pop-up interface 404 corresponds to a "recommendations interface" that may provide an indication to a viewer that the following features or services as provided by the PTR 210 and/or the CSN service 220 of the PTR 210 are available for use or access: Recording Timers; Parental Control; and Favorites Menu. Here, it is contemplated that the viewer may "select" any particular one of those features or services (shown by intermittent line in FIG. 4) and then investigate further via "selection" of an explore control 412, customize via selection of customize control 414, and or activate via selection of an activation button 416 as shown in FIG. 4.

Figure 5:
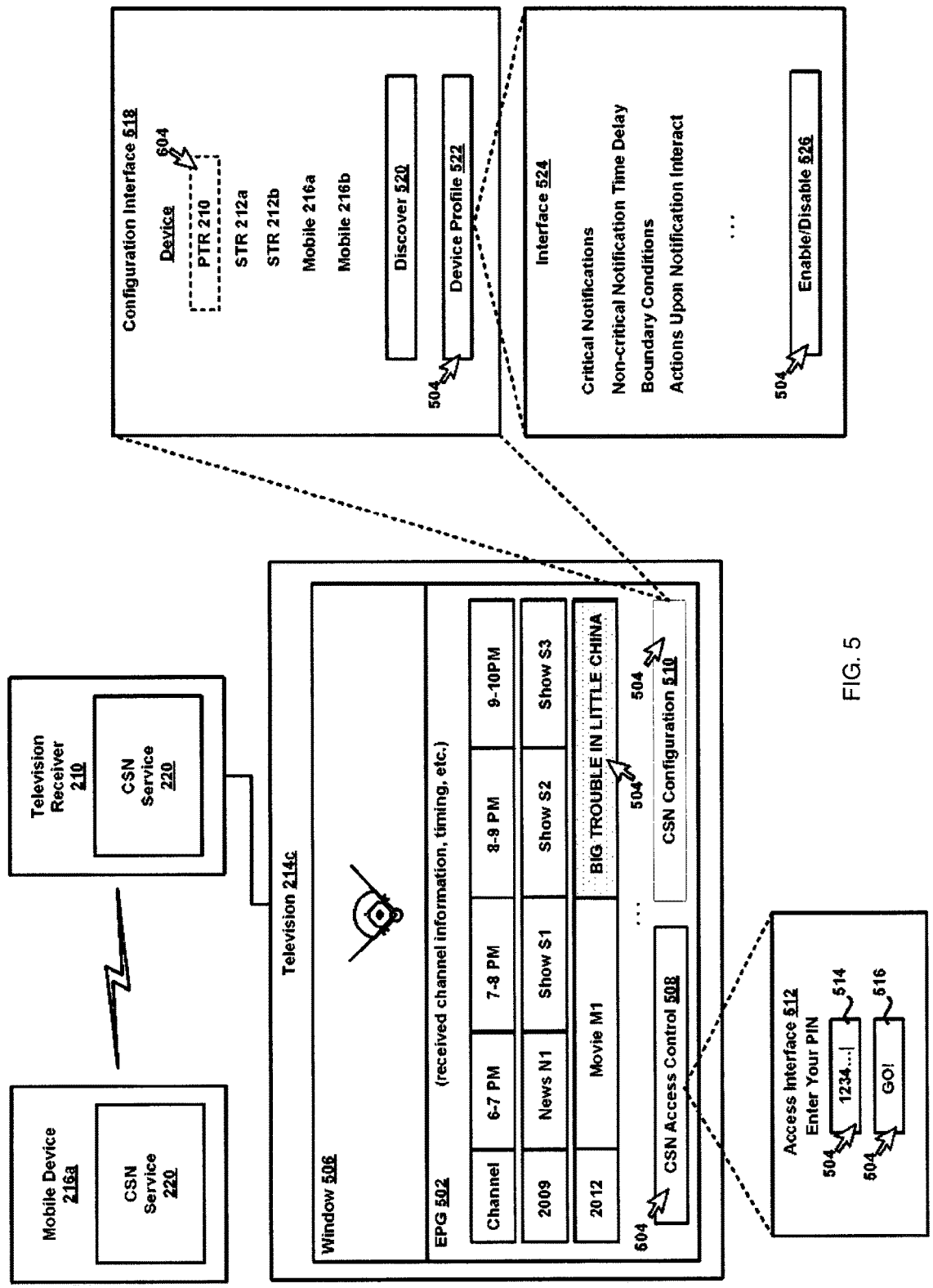
FIG. 5 shows second example aspects of the system of FIG. 2 in detail.

Referring now to FIG. 5, second example aspects of the system 200 of FIG. 2 are shown in detail. In particular, the PTR 210 may be configured to output an EPG (Electronic Programming Guide) 502 to and for presentation the television 214c, for example. The EPG 502 may at least present various information related to television channels and the timing of programs or programming appearing on such television channels. For example, as shown in FIG. 5, the EPG 502 may display information associated with a channel 2012, where the movie Big Trouble in Little China is listed as scheduled to appear on that channel starting at a particular time on a particular day, and etc. In this example, and assuming that a current time is sometime during the time period 8-10 PM, a viewer may manipulate a cursor 504 using a pointing device (not shown) to select, as indicated by stipple shading in FIG. 5, the movie Big Trouble in Little China for immediate viewing within a window 506 on the television 214c. Other examples are possible. For example, it is contemplated that any menu-driven navigation technique or implementation may be used to enable user-interaction with the EPG 502, along with any other elements or interfaces output by the PTR 210 to the television 214c.

In addition to the EPG 502, the PTR 210 may be configured to output various other interactive elements or interfaces. For example, the CSN service 220 of the PTR 210 may be configured to output a control selection 508 and a configuration selection 510, as shown in FIG. 5. In general, the control selection 508 may be considered an access control mechanism to prevent those who may not necessarily be authorized from accessing functionality associated with the configuration selection 510. An example in which this may be beneficial is in a parental control scenario. Here, it is contemplated that a parent may wish for a child to benefit from the aspects of the present disclosure, and further to have control as to how the aspects of the present disclosure apply at or during use of the computing device 216a or television 214c, for example, without having to worry about tampering or disabling or circumvention of the same by the minor.

Accordingly, in practice, the control selection 508 may be selected in order to gain access to a particular interface so that the CSN service 220 of the television 214c, for example, may function according to the wishes of a particular individual (e.g., a parent). For example, the particular individual may manipulate the cursor 504 to select the control selection 508, via a "point and double-click" action, for example and, in response, the CSN service 220 of the PTR 210 may output an access interface 512 to and for presentation by the television 214c. In this example, the access interface 512 may include a prompt "Enter Your PIN" along with a data field 514 and an enter selection 516. Here, the particular individual may enter into the data field 514 an alphanumeric sequence, or the like, and then select the enter selection 516 in effort to gain access to functionality associated with the configuration selection 510.

Assuming that the above-mentioned alphanumeric sequence is authenticated by the CSN service 220 of the PTR 210 following the described sequence, the configuration selection 510 may become "active" so that upon selection of the same a configuration interface 518 may be output to and for presentation by the television 214c. In FIG. 5, the configuration selection 510 is shown as "inactive," indicated by a perimeter line that is weighted less than that of the control selection 508, or by a perimeter line that is lighter in terms of boldness than that of the control selection 508. When the configuration selection 510 becomes "active" the perimeter line of the same would be similar to that of the control selection 508 as shown in FIG. 5.

Again, assuming that the alphanumeric sequence is authenticated by the CSN service 220 of the PTR 210 following the described sequence, the particular individual may manipulate the cursor 504 to select the configuration selection 510 and, in response, the CSN service 220 of the PTR 210 may output the configuration interface 518 to and for presentation by the television 214c. Here, it is contemplated that the particular individual may utilize the configuration interface 518 to configure the CSN service 220 of any particular device of FIG. 2, as desired, so as to implement one or more features or aspects of the present disclosure. For instance, in one example, the configuration interface 518 may include a device discover selection 520 and a device profile selection 522. The interfaces as shown in FIG. 5 are just an example. Other examples may include more or fewer "selections" as desired, and may be implementation-specific, and further may evolve as technology evolves.

In practice, the device discover selection 520 may be selected to pair or otherwise establish a communication link or connection between the PTR 210 and any of the other devices as introduced in FIG. 2 that may have installed thereto a corresponding CSN service 220 and, when successfully "paired," a corresponding device may be listed, possibly persistently, within the configuration interface 518. For example, as shown in FIG. 5, the device discover selection 520 may be selected to pair or otherwise establish a communication link or connection between the PTR 210 and the computing device 216a, and then an indicator that identifies the computing device 216a is shown within the configuration interface 518. In this manner, an individual may interact with the television 214c, and ultimately the PTR 210, to program or configure at least the CSN service 220 of the computing device 216a, as desired, to implement various features or aspects of the present disclosure. As mentioned above, this may, among other things, serve to entice new customers to subscribe to services as offered by a particular satellite television provider, as well as provide an incentive for existing customers to maintain their loyalty and/or relationship with the particular satellite television provider.

Next, but not necessarily so, the individual may configure the CSN service 220 of the PTR 210, for example, to implement various features or aspects of the present disclosure. For example, the indicator that identifies the PTR 210 as shown within the configuration interface 518 may initially be selected, as indicated by intermittent line in FIG. 5, and then the device profile selection 522 may be selected to enable and define if desired (e.g., default parameter values are contemplated) via an interface 524 one or more criteria or parameters for controlling the display of notifications as output by the PTR 210 for display by the television 214c. For example, the individual may define or teach the CSN service 220 what types of notifications or pop-up displays might be considered critical or emergency related. For example, the individual may define or teach the CSN service 220 that notification related to broken or compromise window, similar to that mentioned above, is a critical or emergency-related notification.

As another example, the individual may define or teach the CSN service 220 how "long" to delay output of a particular "non-critical" notification. For example, the individual may define or teach the CSN service 220 to block output of a non-critical notification for at least 10 minutes. In other embodiments, the individual may define or teach the CSN service 220 to block output of a non-critical notification entirely if the content being output by the PTR 210 is "live" or "streaming." As yet another example, the individual may define or teach the CSN service 220 how "long" or "far" to "look-ahead" and/or "look-behind" to possibly extend a block of output of a non-critical notification. For example, the individual may define or teach the CSN service 220 to only "look-ahead" for "5" minutes. As yet another example, the individual may define or teach the CSN service 220 one or more actions to implement upon interaction by the individual with any particular notification. For example, the individual may define or teach the CSN service 220 to record to memory "live" or "streaming" content when the CSN service 220 detects interaction with or within a particular notification during output of "live" or "streaming" content by the PTR 210 to the television 214c for display thereby. An example of such an implementation is discussed in further detail below in connection with FIG. 7.

The configuration interface 518 as shown in FIG. 5 is just an example. Other examples may include more or fewer "selections" as desired, and may be implementation-specific, and further may evolve as technology evolves. However, following definition of one or more criteria or parameters for controlling the display of notifications as output by the PTR 210 for display by the television 214c, for example, it is contemplated that the individual may select an enable selection 526 to activate or otherwise engage the CSN service 220 of the PTR 210 to controlling the display of notifications as output by the PTR 210 for display by the television 214c in accordance with the definitions within the interface 524.

Figure 6:
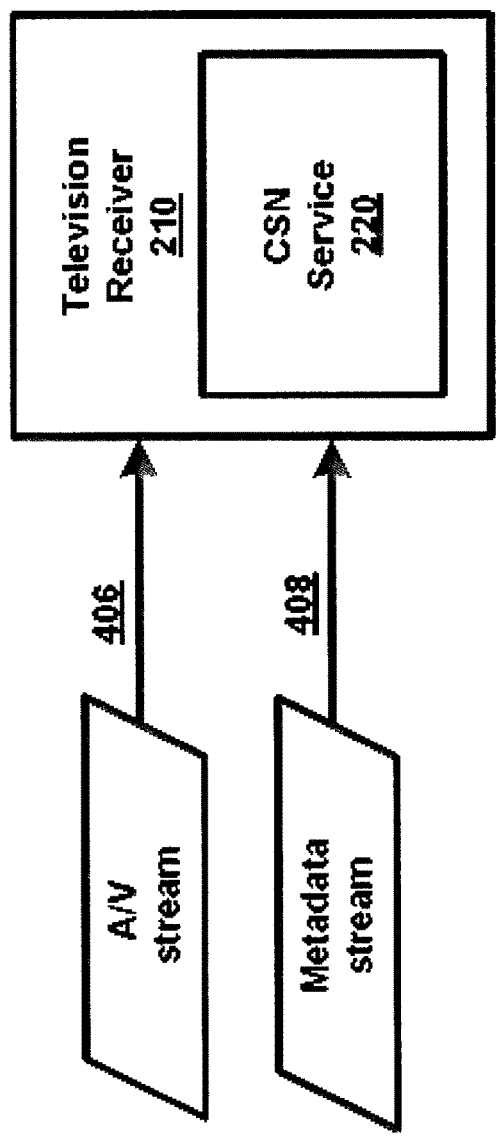
FIG. 6 shows an example metadata stream according to this disclosure.
Figure 6:
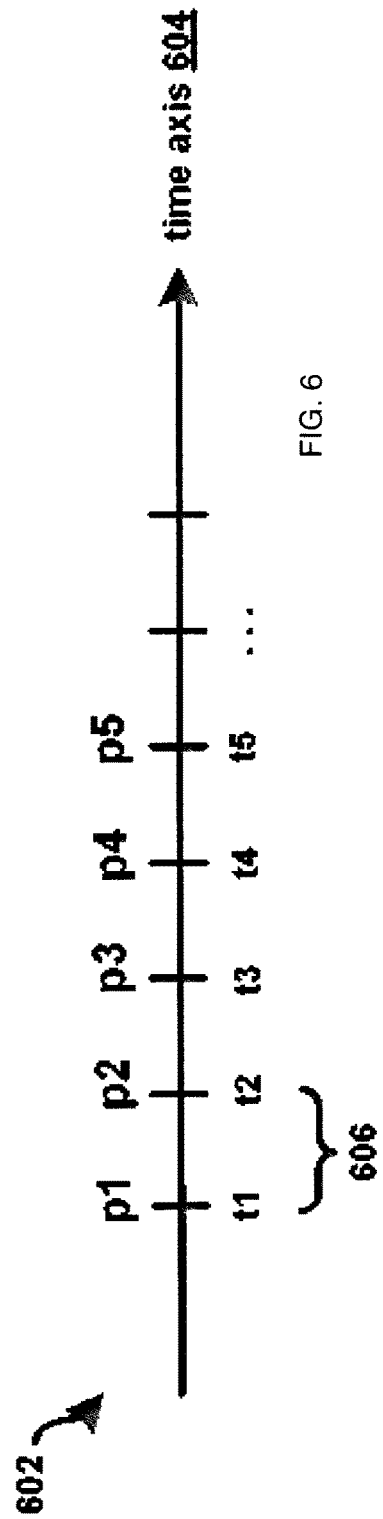

Referring not to FIG. 6, an example embodiment 602 of the metadata stream 408 as introduced above in connection with FIG. 4 is shown. Here, the example embodiment 602 is shown mapped to a time axis 604 in which particular times t1-t5, and etc., are separated by a particular interval 606. It is contemplated that the particular interval 606 is a configurable parameter and may correspond to any particular temporal interval as desired. For example, the particular interval 606 may in some embodiments correspond to 50 milliseconds. As another example, the particular interval 606 may in some embodiments correspond to 60 seconds. As yet another example, the particular interval 606 may in some embodiments correspond to 600 seconds. Still other examples are possible as well.

In this example, the metadata stream 408 is associated with the movie Big Trouble in Little China. Accordingly, it is further contemplated that a parameter that quantifies the degree of tension or conflict in the movie Big Trouble in Little China may be associated with each of the particular times t1-t5, as p1-p5, respectively. In this way, the metadata stream 408 may comprise the data pairs: 1-3; 2-3; 3-3; 4-6; 5-9, and etc., in a manner as discussed above in connection with FIG. 4. Here, (t1, p1)=(1, 3); (t2, p2)=(2, 3); (t3, p3)=(3, 3); (t4, p4)=(4, 6); (t5, p5)=(5, 9); and so on. These example values are examples only. Other examples are possible. Further, it is contemplated that the parameters p1-p5 that quantifies the degree of tension or conflict may be inserted into the metadata stream 408 at particular points t1-t5 in time via manual (e.g., human) insertion, or automatically (e.g., by computer without direct or explicit user-input) based upon an analysis of one or both of audio and video within or of the movie Big Trouble in Little China at any particular point in time.

Figure 7:
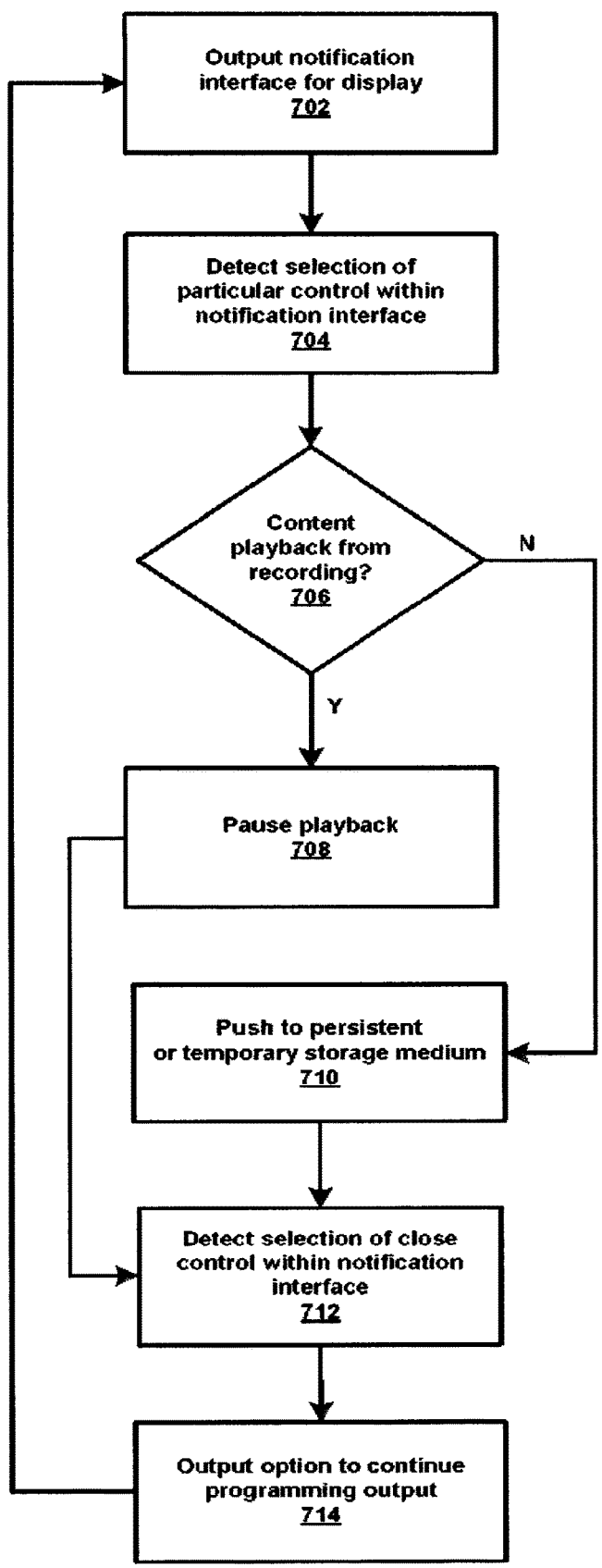
FIG. 7 shows a second example method according to this disclosure.

Referring now to FIG. 7, a second example method 700 is shown according to this disclosure. The method 700 is described as implemented by or on the PTR 210 of FIG. 2. Other embodiments are however possible. For example, one or more modules or steps of the example method 700 may be implemented by one or more of the other respective devices or components within the example system 200 of FIG. 2 as described above.

At step 702, the PTR 210 may output for display by the television 214*c*, for example, the pop-up interface 404 as introduced above in connection with FIG. 4. In this example, it is contemplated the CSN service 220 of the PTR 210 may have output for display by the television 214*c* the pop-up interface 404 at some point during the movie Big trouble in Little China at a particular time during that movie, and it is further contemplated that a particular one of the user-selectable links or controls 405 may be selected as desired, and/or a particular one of the user-selectable links or controls 412, 414, 416 may be selected as desired. For example, at step 704, the CSN service 220 of the PTR 210 may detect that control 412 as shown in FIG. 4 has been selected by an end-user. Next, at step 706, the CSN service 220 of the PTR 210 may make a determination as to whether the movie Big Trouble in Little China is being played-back from a recording or is being received "live" by the PTR 210 via one of satellites 206*a-c* and the satellite dish 208 such as discussed above in connection with FIG. 2.

If the CSN service 220 of the PTR 210 determines that the movie Big Trouble in Little China is being played-back from a recording, process flow within the method 700 may branch to step 708. At step 708, the CSN service 220 of the PTR 210 may command the PTR 210 to pause playback of the movie Big Trouble in Little China to enable the end-user to interact with the pop-up interface 404 without missing any of the action of the movie Big Trouble in Little China. If the CSN service 220 of the PTR 210 determines that the movie Big Trouble in Little China is being received "live" by the PTR 210, process flow within the method 700 may branch to step 710. At step 710, the CSN service 220 of the PTR 210 may command the PTR 210 to store or buffer the movie Big Trouble in Little China, again to enable the end-user to interact with the pop-up interface 404 without missing any of the action of the movie Big Trouble in Little China.

Next, at step 712, the CSN service 220 of the PTR 210 may detect a selection made by the end-user to close the pop-up interface 404 so that the same, or a related interface, is no longer displayed by the television 214*c*. In response, at step 714, the CSN service 220 of the PTR 210 may output for display by the television 214*c* an interface that provides the end-user an option to restart playback of the recording of the movie Big Trouble in Little China, or, to engage a "trick-mode" so as to allow the end-user to re-play a portion of the movie Big Trouble in Little China as stored as step 710. Process flow within the method 700 may then branch back to step 702. Such a branch is intended to show that flow within the method 700 is continuous.

In some examples, digital tracks that are context-sensitive may be created for movies, similar to subtitles. It is contemplated that such tracks may be created simultaneously during production of a particular movie, or at a later date. It is further contemplated that any particular track may different than another. Examples of such include (1) tension of plot track (2) erotic level track (3) actor-specific track. Other examples are possible.

Figure 8:
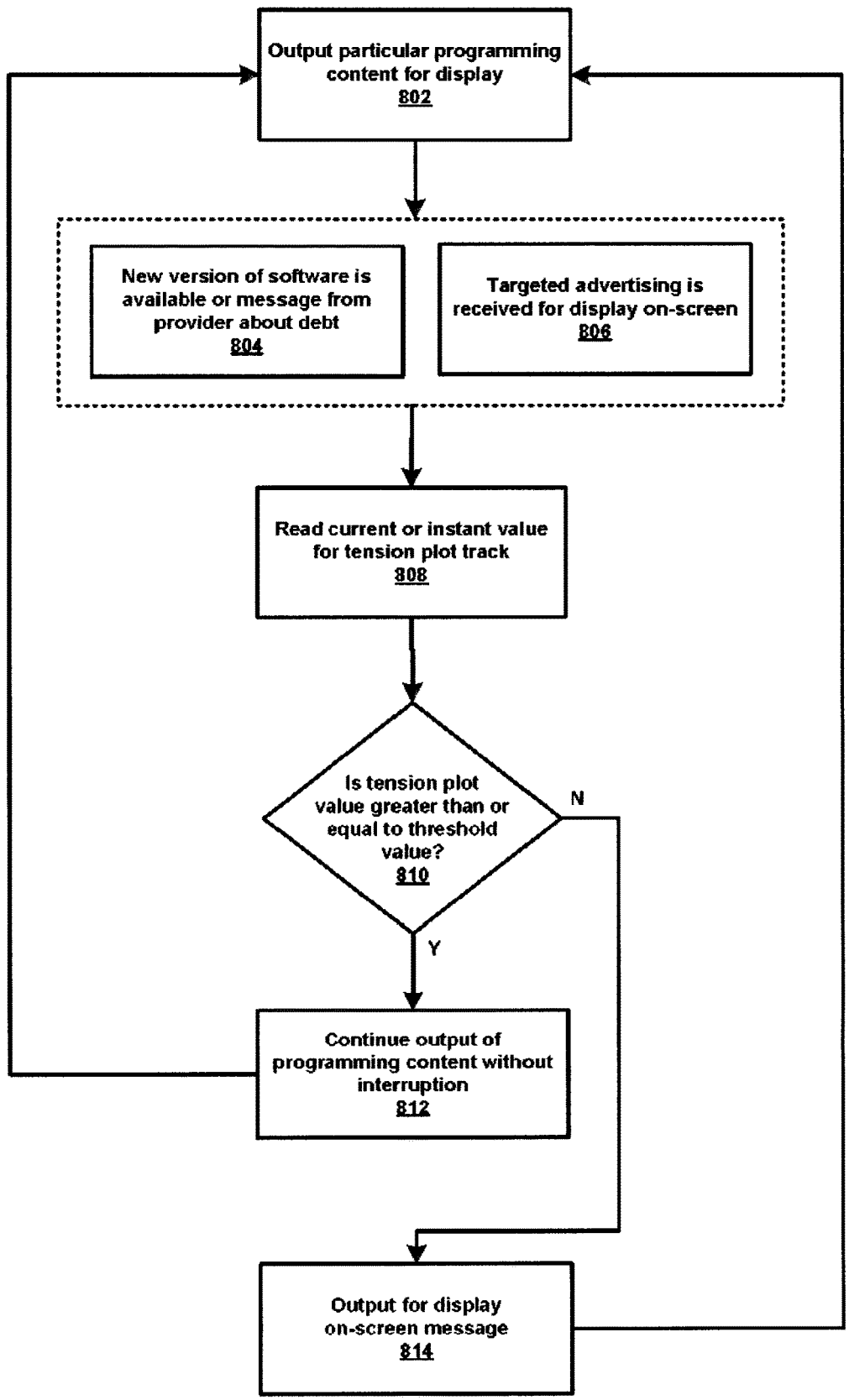
FIG. 8 shows a third example method according to this disclosure.

Referring now to FIG. 8, a third example method 800 is shown according to this disclosure. The method 800 is described as implemented by or on the PTR 210 of FIG. 2. Other embodiments are however possible. For example, one or more modules or steps of the example method 800 may be implemented by one or more of the other respective devices or components within the example system 200 of FIG. 2 as described above.

In general, the method 800 may represent an example implementation of (1) tension of plot track, as mentioned above. In practice, the method 800 may enable an automatic choice of moment (e.g., a preferred time for an interruption) for an advertising or other break or interruption during a movie broadcast. It is contemplated that it may be undesirable to interrupt the movie viewing experience if plot tension at a particular moment of the movie is relatively "high," where automatic permission for interruption for an advertising break may be done only if plot tension is relatively "low." It is further contemplated scene transitions may be marked with relatively "low" or "zero" tension.

Referring still to FIG. 8, at step 802, the PTR 210 may output for display by the television 214*c*, for example, particular programming content, such as a movie. At step 804 or step 806, respectively, the PTR 210 may determine (804) that a new version of software for the PTR 210 is available or that a message about debt is to be output for display by the television 214*c*, or the PTR 210 may determine (806) that a targeted advertisement is to be output for display by the television 214*c*. At step 808 the PTR 210 (or CSN service 220) may read a current or instant plot tension value, and at step 810 the PTR 210 may determine whether the plot tension value is greater than or equal to a predetermined and possibly user-defined threshold value.

If the plot tension value is greater than or equal to the predetermined and possibly user-defined threshold value, flow within the example method 800 may branch to step 812 whereby the PTR 210 may continue to output for display by the television 214*c* the particular programming content, without interruption of the same. Process flow may then branch back to step 802 so that the example method 800 is continuously implemented during the broadcast of the programming content. If though the plot tension value is not greater than or equal to the predetermined and possibly user-defined threshold value, flow within the example method 800 may branch to step 814 whereby the PTR 210 may output for display by the television 214*c* a particular message consistent with one or both of steps 804 and 806, thereby interrupting the particular programming content. Other examples are possible.

Figure 9:
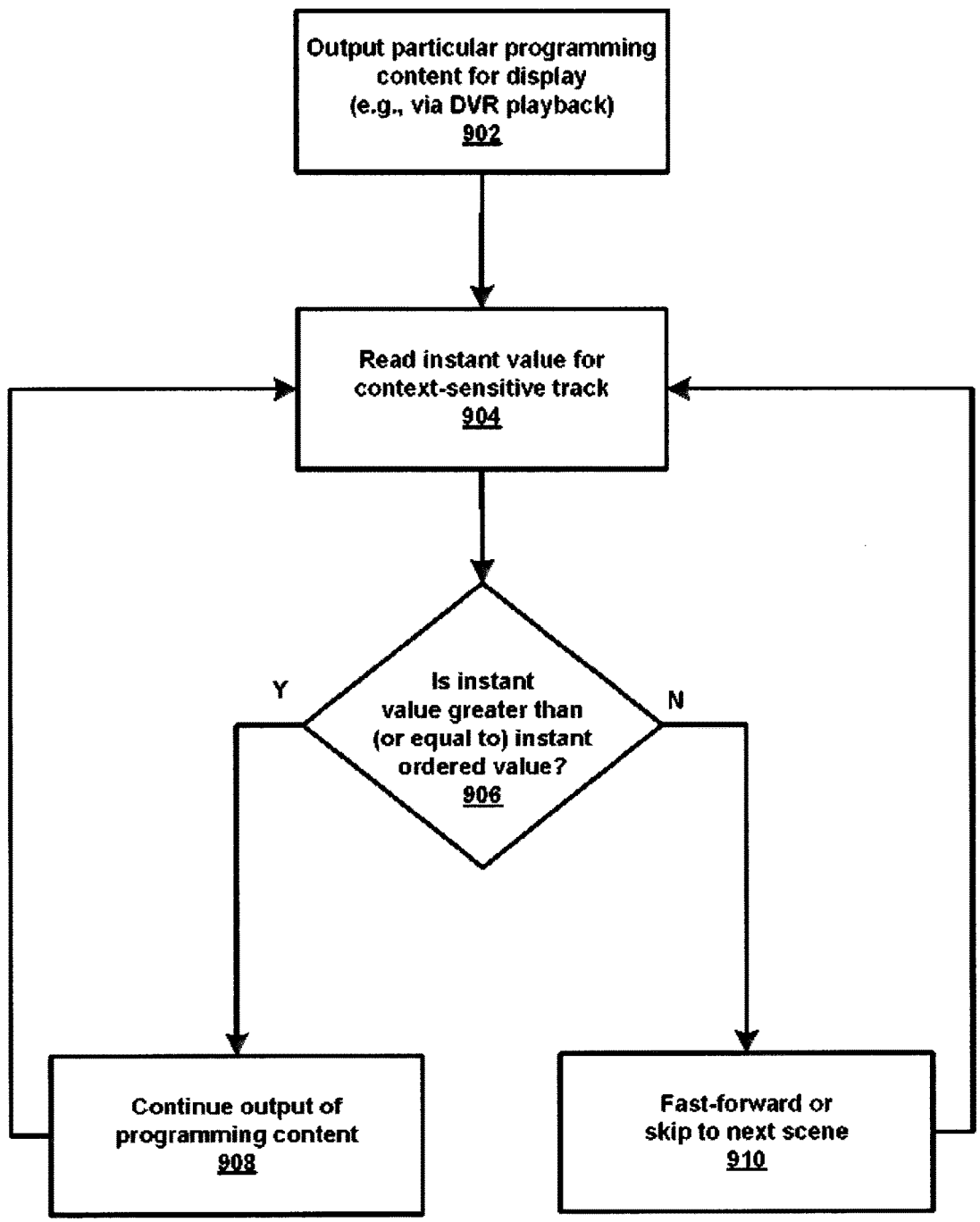
FIG. 9 shows a second example method according to this disclosure.

For example, referring now to FIG. 9, a fourth example method 900 is shown according to this disclosure. The method 900 is described as implemented by or on the PTR 210 of FIG. 2. Other embodiments are however possible. For example, one or more modules or steps of the example method 900 may be implemented by one or more of the other respective devices or components within the example system 200 of FIG. 2 as described above.

In general, the method 900 may represent an example implementation of (2) erotic level track and/or (3) actor-specific track, as mentioned above. In practice, with respect to (2) erotic level track, the method 900 may enable a user to watch only erotic/sexual scenes from given movie, based upon particular, possibly scene-specific, values defined within or of the erotic level track. An example scene-labeling scheme may include or comprise 1-kissing, 2-erotic, 3-sex scene. Many other example are possible, Also, with respect to (3) actor-specific track, the method 900 may enable a user to watch scenes only with a favorite actor, skipping the rest.

An example scene-labeling scheme may include or comprise, with reference to an Actor A, a binary level 0 or 1 wherein if "1" then it may be determined that Actor A is present in a particular scene, otherwise it may be determined that Actor A is not present in the particular scene. Many other examples are possible, some of which may or may not be implementation-specific and/or enable or disabled so that an end-user may pick and choose which one of (1) tension of plot track (2) erotic level track (3) actor-specific track is to be utilized or leveraged during any particular program watching experience or event.

Referring still to FIG. 9, at step 902, the PTR 210 may output for display by the television 214c, for example, particular programming content, such as a movie. In some examples, the movie may be played back by a video recorder, the present disclosure though is not so limiting. At step 904 the PTR 210 (or CSN service 220) may read a current or instant value of a particular context-sensitive track (e.g., one of (2) erotic level track and (3) actor-specific track), and at step 906 the PTR 210 may determine whether the current or instant value of the particular context-sensitive track is greater than (or possibly equal to) a predetermined and possibly user-defined threshold value.

If the current or instant value of the particular context-sensitive track is greater than (or possibly equal to) the predetermined and possibly user-defined threshold value, flow within the example method 900 may branch to step 908 whereby the PTR 210 may continue to output for display by the television 214c the particular programming content. Process flow may then branch back to step 904 so that the example method 904 is continuously implemented during the output of the particular programming content. If though the current or instant value of the particular context-sensitive track is not greater than (or possibly equal to) the predetermined and possibly user-defined threshold value, flow within the example method 900 may branch to step 910 whereby the PTR 210 may fast-forward or possibly skip to a next scene within the particular programming content that which has associated therewith a particular context-sensitive track "value." Process flow may then branch back to step 904 so that the example method 900 is continuously implemented during the output of the particular programming content. Still many other examples are possible.

Figure 10:
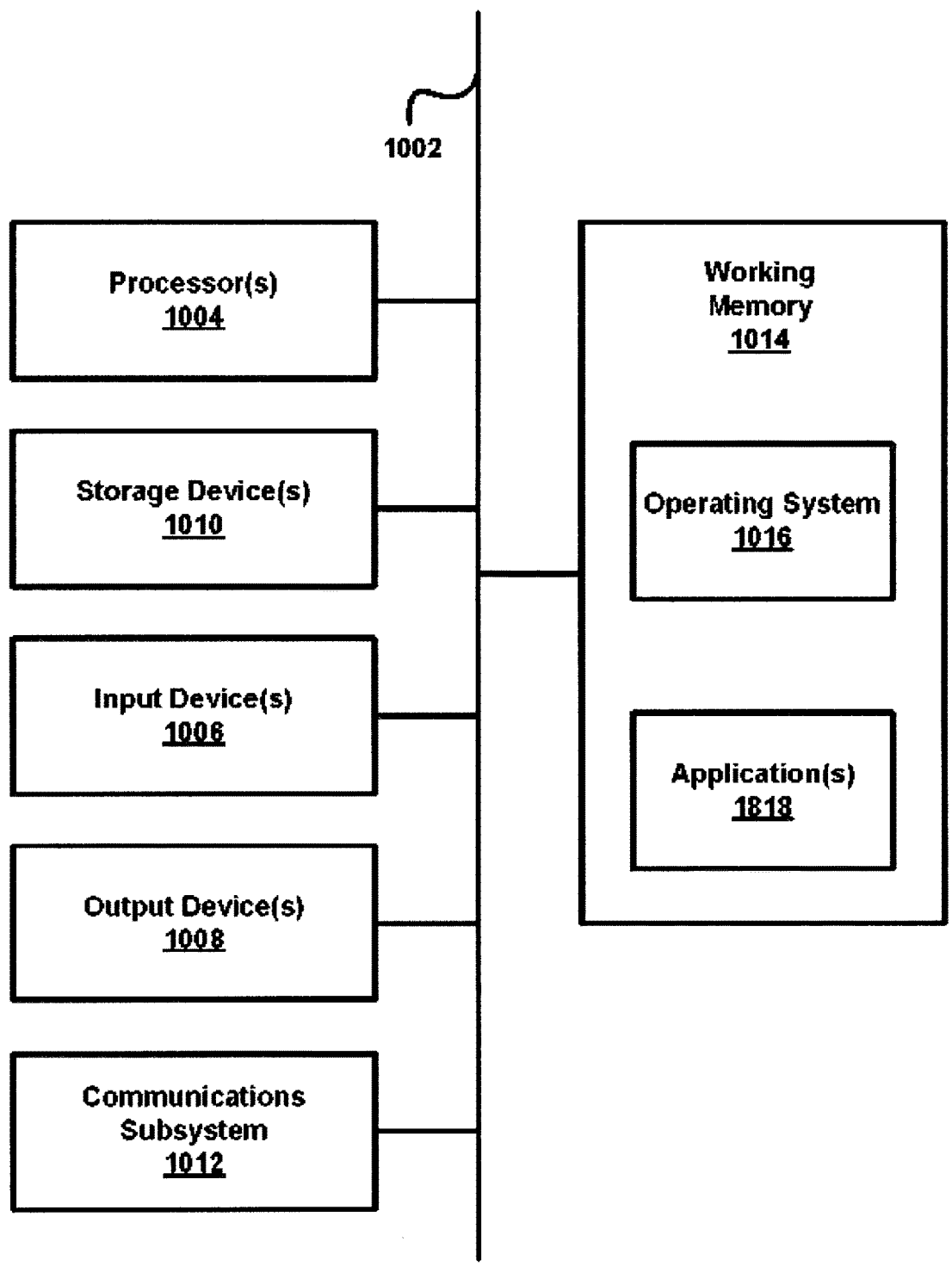
FIG. 10 shows an example computing system or device.

FIG. 10 shows an example computer system or device 1000 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 1000, such as any of the respective elements of at least FIG. 2. In this manner, any of one or more of the respective elements of at least FIG. 2 may be configured and/or arranged, wholly or at least partially, for controlling the display of notifications to a television viewer based on one or more contextual parameters, in manner consistent with that discussed above in connection with FIGS. 1-8. For example, any of one or more of the respective elements of at least FIG. 2 may be configured and/or arranged to perform and/or include instructions that, when executed, perform the method of FIG. 1 and/or FIGS. 7-9. Still further, any of one or more of the respective elements of at least FIG. 2 may be configured to perform and/or include instructions that, when executed, instantiate and implement functionality of the PTR 210 and/or the computing devices 216a-b and/or the server(s) 218 of FIG. 2.

The computer device 1000 is shown comprising hardware elements that may be electrically coupled via a bus 1002 (or may otherwise be in communication, as appropriate). The hardware elements may include a processing unit with one or more processors 1004, including without limitation one or more general-purpose processors and/or one or more special-purpose processors (such as digital signal processing chips, graphics acceleration processors, and/or the like); one or more input devices 1006, which may include without limitation a remote control, a mouse, a keyboard, and/or the like; and one or more output devices 1008, which may include without limitation a presentation device (e.g., television), a printer, and/or the like.

The computer system 1000 may further include (and/or be in communication with) one or more non-transitory storage devices 1010, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1000 might also include a communications subsystem 1012, which may include without limitation a modem, a network card (wireless and/or wired), an infrared communication device, a wireless communication device and/or a chipset such as a Bluetooth™ device, 1002.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1012 may permit data to be exchanged with a network (such as the network described below, to name one example), other computer systems, and/or any other devices described herein. In many embodiments, the computer system 1000 will further comprise a working memory 1014, which may include a random access memory and/or a read-only memory device, as described above.

The computer device 1000 also may comprise software elements, shown as being currently located within the working memory 1014, including an operating system 1016, device drivers, executable libraries, and/or other code, such as one or more application programs 1818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1010 described above. In some cases, the storage medium might be incorporated within a computer system, such as computer system 1000. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 1000) to perform methods in accordance with various embodiments of the disclosure. According to a set of embodiments, some or all of the procedures of such methods are performed by the computer system 1000 in response to processor 1004 executing one or more sequences of one or more instructions (which might be incorporated into the operating system 1016 and/or other code, such as an application program 1818) contained in the working memory 1014. Such instructions may be read into the working memory 1014 from another computer-readable medium, such as one or more of the storage device(s) 1010. Merely by way of example, execution of the sequences of instructions contained in the working memory 1014 may cause the processor(s) 1004 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 1000, various computer-readable media might be involved in providing instructions/code to processor(s) 1004 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1010. Volatile media may include, without limitation, dynamic memory, such as the working memory 1014.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1004 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1012 (and/or components thereof) generally will receive signals, and the bus 1002 then might carry the signals (and/or the data, instructions, etc. carried by the signals) to the working memory 1014, from which the processor(s) 1004 retrieves and executes the instructions. The instructions received by the working memory 1014 may optionally be stored on a non-transitory storage device 1010 either before or after execution by the processor(s) 1004.

It should further be understood that the components of computer device 1000 can be distributed across a network. For example, some processing may be performed in one location using a first processor while other processing may be performed by another processor remote from the first processor. Other components of computer system 1000 may be similarly distributed. As such, computer device 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, by a television receiver, a packetized A/V stream comprising audio/video of particular programming content;
   receiving, by the television receiver, a packetized metadata stream temporally synchronized to the particular programming content to indicate, for each of a plurality of intervals in time of the particular programming content, a respective parameter value corresponding to a viewer significance attributed to the interval in time of the particular programming content, such that the packetized metadata stream indicates a first parameter value for a first interval of the plurality of intervals in time and a second parameter value for a second interval of the plurality of intervals in time, the second interval not overlapping in time with the first interval, and the second parameter value being different from the first parameter value;
   outputting, by the television receiver, the particular programming content for display by a presentation device in accordance with the packetized A/V stream;
   monitoring, by the television receiver during the outputting, the packetized metadata stream to identify one of the plurality of intervals in time as corresponding to a presently displayed portion of the particular programming content, and to determine a present parameter value as the respective parameter value indicated by the packetized metadata stream for the identified one of the plurality of intervals in time;
   detecting that the present parameter value is greater than or equal to a pre-defined and user-configurable threshold value; and
   blocking, by the television receiver, output of a notification for display by the presentation device during the outputting of the particular programming content in response to the detecting.

2. The method of claim 1, further comprising:
   detecting a command to enable the blocking of output of particular notifications for display by the presentation device; and
   enabling, in response to detecting the command, the blocking of output of particular notifications for display by the presentation device during the outputting of the particular programming content.

3. The method of claim 1, further comprising:
   detecting a command to disable the blocking of output of particular notifications for display by the presentation device; and
   disabling, in response to detecting the command, the blocking of output of particular notifications for display by the presentation device during the outputting of the particular programming content.

4. The method of claim 1, further comprising:
   downloading the stream of metadata as a file from a remote server system over a terrestrial network communication link.

5. The method of claim 1, further comprising:
   receiving the stream of metadata together with the particular programming content over a satelite network communication link.

6. The method of claim 1, further comprising:
   determining that the notification is of a particular type;
   disabling, based on the determining that the notification is of a particular type, the blocking of the display of the notification; and
   outputting the notification for display by the presentation device.

7. The method of claim 6, further comprising:
   recording the particular programming content to a storage device during the outputting of the notification for display by the presentation device; and
   playing-back at least a portion of the recorded content subsequent the outputting of the notification for display by the presentation device.

8. The method of claim 6, further comprising:
   pausing the outputting of the particular programming content during the outputting of the notification for display by the presentation device; and
   continuing the outputting of the particular programming content subsequent stoppage of the outputting of the notification for display by the presentation device.

9. The method of claim 1, wherein:
   for each of the plurality of intervals in time of the particular programming content, the respective parameter value quantifies a degree of tension or conflict at a particular point in time of the particular programming content.

10. The method of claim 1, further comprising:
    receiving, by the television receiver, the notification from a home automation system.

11. The method of claim 1, further comprising:
    receiving, by the television receiver, the notification from a home security system.

12. The method of claim 1, further comprising:
    determining, prior to the blocking, whether the notification is time sensitive,
    wherein the blocking is performed only when the notification is determined not to be time sensitive.

13. The method of claim 1, further comprising:
    looking ahead and/or looking behind in the packetized metadata stream to determine a relative viewer significance of the identified one of the plurality of intervals in time as compared to past and/or future ones of the plurality of intervals in time;
    determining whether to perform the blocking according to the relative viewer significance; and
    performing the blocking according to the determining whether to perform the blocking.

14. A television receiver, comprising:
    a processor; and
    a memory element communicatively coupled with and readable by the processor, and having stored therein processor-readable instructions that when executed cause the processor to:
    monitor a stream of metadata that is synchronized to particular programming content as the particular programming content is output for display by a presentation device communicatively coupled to the television receiver, the stream of metadata indicating, for each of a plurality of intervals in time of the particular programming content, a respective parameter value corresponding to a viewer significance attributed to the interval in time of the particular programming content, such that the packetized metadata stream indicates a first parameter value for a first interval of the plurality of intervals in time and a second parameter value for a second interval of the plurality of intervals in time, the second interval not overlapping in time with the first interval, and the second parameter value being different from the first parameter value;

determine, during a particular interval in time of the plurality of intervals in time, that the respective parameter value for a particular instance of metadata of the stream of metadata associated with the particular interval in time has a value that is greater than or equal to a threshold value; and prevent output of a notification for display by the presentation device during the output of the particular programming content at a time in response to the determining.

15. The television receiver of claim 14, wherein the memory having stored therein processor-readable instructions that when executed cause the processor to:

download the stream of metadata as a file from a remote server system over a terrestrial network communication link.

16. The television receiver of claim 14, wherein the memory having stored therein processor-readable instructions that when executed cause the processor to:

receive the stream of metadata together with the particular programming content over a satelite network communication link.

17. The television receiver of claim 14, wherein the memory having stored therein processor-readable instructions that when executed cause the processor to:

enable output of the notification for display by the presentation device during the output of the particular programming content based upon a determined type of the notification; and output the notification for display by the presentation device during output of the particular programming content.

18. The television receiver of claim 14, wherein:

for each of the plurality of intervals in time of the particular programming content, the respective parameter value quantifies a degree of tension at the interval time of the particular programming content.

19. A computer-implemented method, comprising:

monitoring, by a computing device, a track of metadata that is synchronized to particular media content, during the output of the particular media content for display by a presentation device, the track of metadata indicating, for each of a plurality of intervals in time of the particular media content, a respective parameter value corresponding to a viewer significance attributed to the interval in time of the particular media content, such that the track of metadata indicates a first parameter value for a first interval of the plurality of intervals in time and a second parameter value for a second interval of the plurality of intervals in time, the second interval not overlapping in time with the first interval, and the second parameter value being different from the first parameter value;

determining, by the computing device at a particular time, that the respective parameter value for a particular instance of metadata of the track of metadata associated with the particular time has a value that is greater than or equal to a threshold value; and blocking, by the computing device in response to the determining, output of any notifications for display by the presentation device during the outputting of the particular programming content starting at the particular time and for a pre-defined time period.

* * * * *